(12) United States Patent  
Bauernfeind et al.

(10) Patent No.: US 9,674,176 B2  
(45) Date of Patent: Jun. 6, 2017

(54) RADIO COMMUNICATION DEVICE AND METHOD FOR BOOTING A RADIO COMMUNICATION DEVICE

(75) Inventors: Hans Bauernfeind, Nuremberg (DE); Uwe Hildebrand, Nuremberg (DE); Martin Wulsten, Nuremberg (DE)

(73) Assignee: Intel Deutschland GmbH, Neubiberg (DE)

( * ) Notice: Subject to any disclaimer, the term of this patent is extended or adjusted under 35 U.S.C. 154(b) by 1793 days.

(21) Appl. No.: 11/964,338

(22) Filed: Dec. 26, 2007

(65) Prior Publication Data

US 2009/0170473 A1 Jul. 2, 2009

(51) Int. Cl.
| | |
|---|---|
| *H04M 1/66* | (2006.01) |
| *H04L 29/06* | (2006.01) |
| *H04W 12/06* | (2009.01) |
| *H04W 88/02* | (2009.01) |

(52) U.S. Cl.
CPC .......... *H04L 63/083* (2013.01); *H04W 12/06* (2013.01); *H04W 88/02* (2013.01)

(58) Field of Classification Search
CPC ... H04M 1/66; H04B 1/38; H04L 9/32; H04L 9/00
USPC ....... 455/411, 556.1, 556.2, 558; 713/2, 193
See application file for complete search history.

(56) References Cited

U.S. PATENT DOCUMENTS

| | | |
|---|---|---|
| 2002/0045465 A1 | 4/2002 | Kishida et al. |
| 2003/0107600 A1 | 6/2003 | Kwong et al. |
| 2005/0021940 A1* | 1/2005 | Ma ................................. 713/155 |
| 2005/0075135 A1* | 4/2005 | Cromer et al. ............... 455/558 |
| 2005/0198082 A1* | 9/2005 | Balachandran et al. ...... 707/203 |
| 2005/0198982 A1* | 9/2005 | Kubo ............................... 62/236 |
| 2006/0129848 A1* | 6/2006 | Paksoy et al. ................ 713/193 |
| 2007/0136536 A1* | 6/2007 | Byun et al. ................... 711/149 |
| 2007/0283431 A1* | 12/2007 | Ueda ................................ 726/19 |
| 2008/0005577 A1* | 1/2008 | Rager et al. .................. 713/183 |
| 2008/0282084 A1* | 11/2008 | Hatakeyama ................. 713/155 |

* cited by examiner

Primary Examiner — Myron K Wyche  
(74) Attorney, Agent, or Firm — Schiff Hardin LLP

(57) ABSTRACT

In various embodiments of the invention, a radio communication device and a method for booting a radio communication device are provided. In an embodiment of the invention, an operating system code of a processor is loaded during execution of an authentication procedure code.

32 Claims, 5 Drawing Sheets

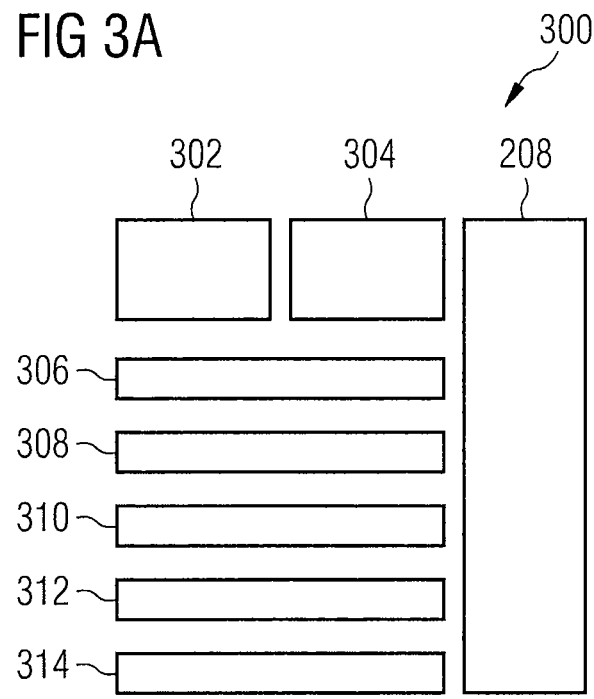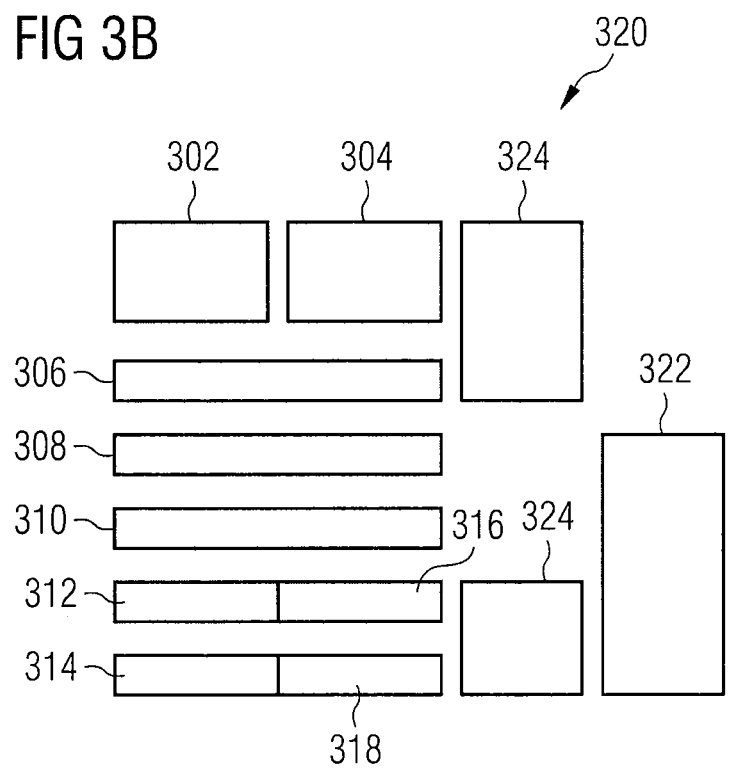

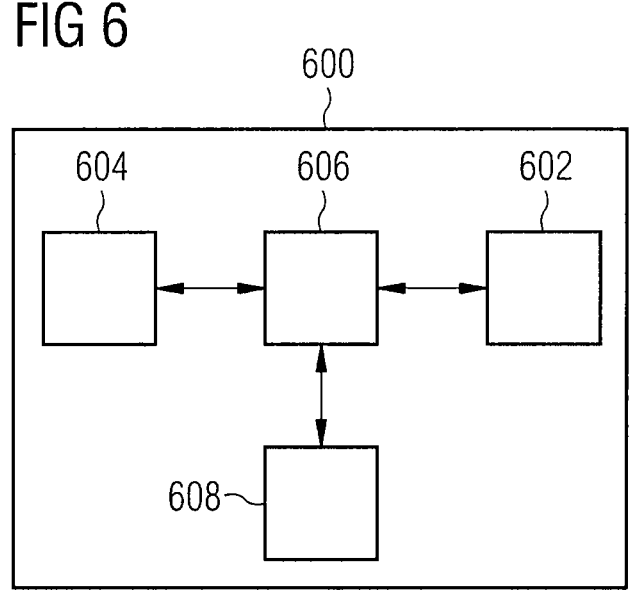
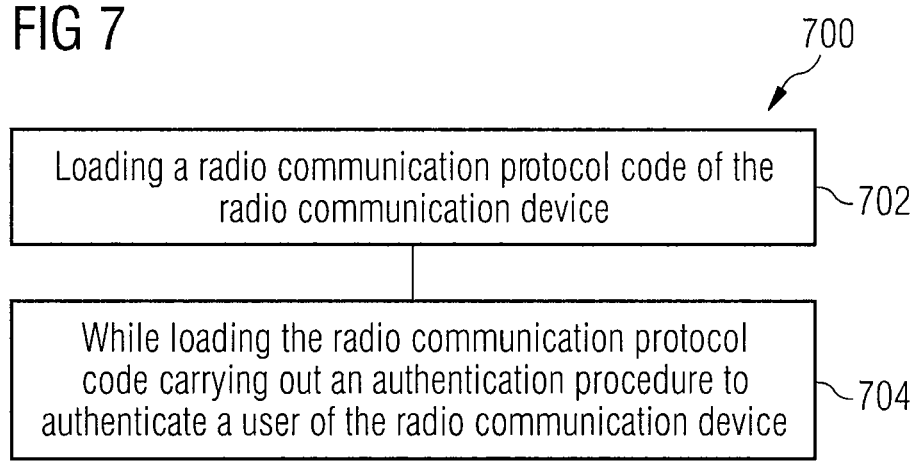

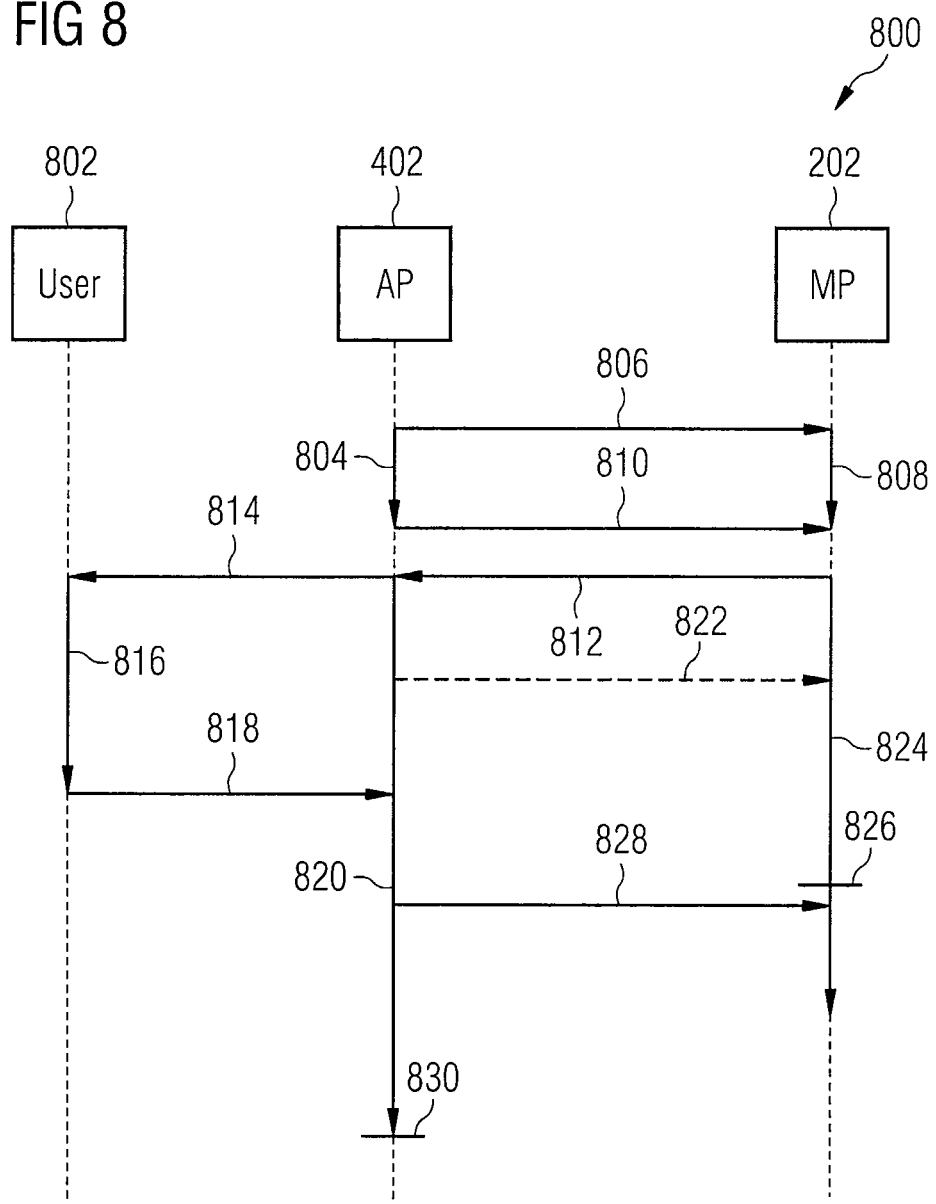

RADIO COMMUNICATION DEVICE AND METHOD FOR BOOTING A RADIO COMMUNICATION DEVICE

TECHNICAL FIELD

Embodiments of the present invention relate generally to a radio communication device and a method for booting a radio communication device.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIGS. 3A and 3B show high-level hardware and software structures;

FIG. 6 shows a circuit device arrangement according to an embodiment of the invention;

FIG. 7 shows a second method for booting a radio communication device; and

FIG. 8 shows a time diagram representing an example of an embodiment of the invention.

DESCRIPTION

Embodiments of the invention provide a fast detection after powering on a radio communication device whether a user identification card is present and the card holder verification (CHV) is enabled, and a fast prompting of the user for PIN (personal identification number) entry (if required).

In the context of this description under a user identification card may be understood as e.g. a SIM (Subscriber Identity Module) as used in GSM, UICC (Universal Integrated Circuit Card) as used in UMTS (Universal Mobile Telecommunications System) or similar cards. In UMTS the UICCs contain one or more applications. At least one of these applications represents a USIM (Universal Subscriber Identity Module). The UICC may contain several USIMs.

Conventionally, smartphones usually offer Personal Digital Assistant (PDA) functionality by running an operating system (OS) like Symbian, Windows (CE, mobile), or Linux. Since these operating systems are not real time capable, they are running on an own processor, the application processor (AP), while the telephony functionality (the 2G/3G protocol stack) has to be run on a separate modem processor (MP). Both of the processors, the application processor and the modem processor have their own memory subsystem, often including Random Access Memory (RAM), and Flash- or Read Only Memory (ROM) devices.

Figure 1:
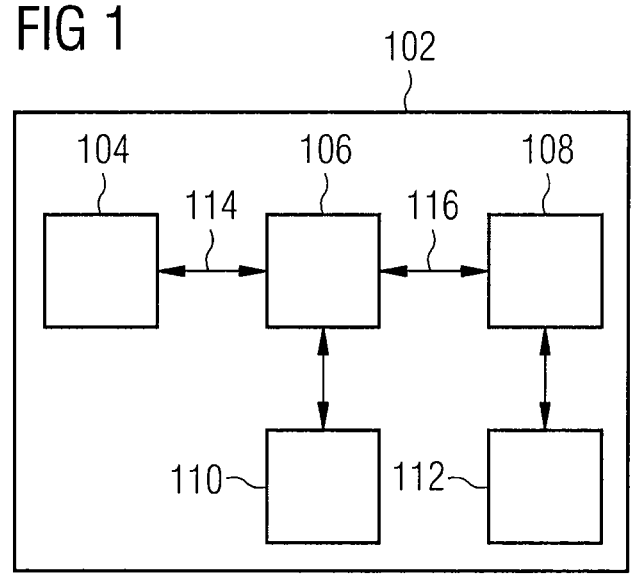
FIG. 1 shows a processor and memory arrangement of a mobile device.

FIG. 1 shows a processor and memory arrangement of a mobile device 102.

As depicted in FIG. 1, more advanced systems may use one inexpensive NAND (Not AND)-flash device 104 or a ROM (Read Only Memory) for non volatile storage holding code and data for both of processors, e.g. an application processor 106, and a modem processor 108 while the system is switched off. For storage of code and data during runtime, inexpensive DRAM (Dynamic Random Access Memory) devices 110, 112 are used which are inexpensive compared to SRAM (Static Random Access Memory) devices. The code and data may be copied during start up of the system from the NAND flash 104 to the DRAM 110, 112 of the corresponding processor 106, 108. In a two-processor system as shown in FIG. 1 a non-real-time operating system and application code and data may be loaded into a first DRAM 110 (which may be assigned to only the application processor 106), whereas a real-time operating system and the protocol stack according to a communication protocol may be loaded into a second DRAM 112 (which may be assigned to only the modem processor 108).

During normal operation, the communication protocol stack executed by the MP 108 is responsible for handling the card interface and the SIM or the UICC, respectively, of the mobile device 102, for example. The communication protocol stack, once downloaded to the MP 108, checks for the presence of a SIM or UICC, and if the card holder verification (CHV) is enabled, i.e. if the entry of a PIN (Personal Identification Number) is required.

When the non-volatile memory, 104, e.g. the mentioned NAND-flash device, a NOR (Not OR)-flash device or a ROM (Read Only Memory), is connected to the AP 106, the code and constant data for the MP 106 has to be downloaded via a memory interface 114 to the AP 106 and via a serial line 116 from the AP 106 to the MP 108. Instead of a serial line 116, also other connections are possible, as e.g. parallel lines or any kind of data buses. Since the communication protocol stack has a size of several Megabyte (MB), this download requires several seconds time, which would add to the overall boot time of the operating system of the mobile device 102. During this time, the user would have to wait to be prompted for the entry of his Personal Identification Number (PIN).

Another point beside the negative user experience may be that network operators have set-up requirements for the time from switch-on of such a mobile device (such as e.g. a mobile radio phone) to the point in time, where the user is prompted for PIN entry. These timing requirements may then be violated.

In the context of this description, a "volatile memory" may be understood as a memory storing data, the stored data being maintained as long as a power supply voltage of the memory system being active, in other words, in a state of the memory, in which it is provided with power supply voltage.

A "non-volatile memory" may be understood as a memory storing data even if it is not active. In an embodiment of the invention, a memory may be understood as being not active e.g. if currently access to the content of the memory is inactive. In another embodiment, a memory may be understood as being not active e.g. if the power supply is inactive. Furthermore, the stored data may be refreshed on a regular timely basis, but not, as with a "volatile memory" every few picoseconds or nanoseconds or milliseconds, but rather in a range of hours, days, weeks or months. Alternatively, the data may not need to be refreshed at all in some designs.

In an embodiment of the invention, an "operating system" may be understood as an kernel of an operating system and additional system software. The system software may be e.g.

a middleware as e.g. power management, memory management and system status. Operating systems may be classified into Real Time Operating Systems (RTOS), being capable of keeping processing deadlines and having a deterministic behaviour and into Operating Systems not possessing real time capability. In this description the operating systems may be operating system that are applied to communication devices, especially to radio communication devices. Thus, in broader sense, the RTOS may be understood as a kernel and software for wireless communications as e.g. a wireless protocol; and an Operating System (OS), i.e. an OS not necessarily real-time capable, may be understood to include, besides of the kernel, additional software, as system software as e.g. drivers or graphical user interfaces or further software as e.g. a Virtual Java machine (JVM), or software that supports Messaging, Multimedia, Browsing etc.

Operating Systems for communication systems may further include a Telephony Application Programming Interface (TAPI).

Figure 2:
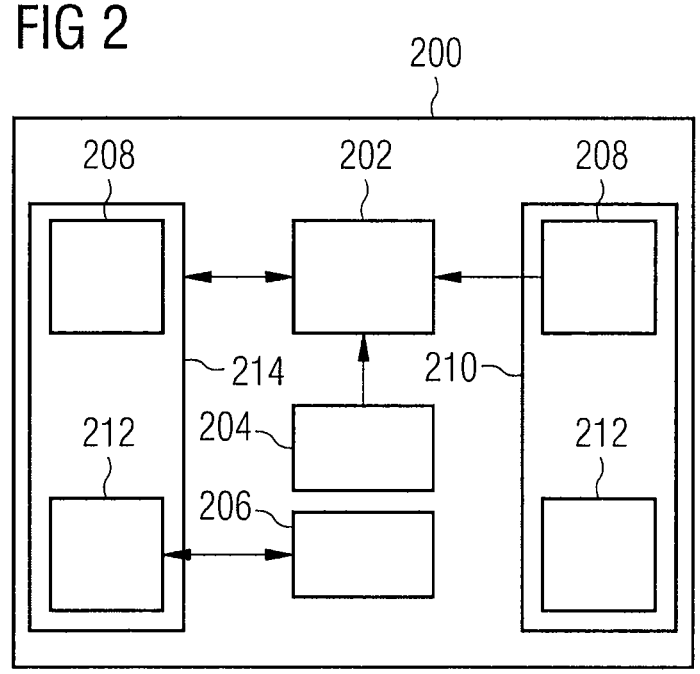
FIG. 2 shows the boot-related circuits for a mobile radio communication device according to an embodiment of the invention.

FIG. 2 shows an embodiment of the invention, according to which a radio communication device 200 is provided, which may include a processor 202, a memory 210 configured to store an operating system code 208 and an authentication procedure code 212, wherein the authentication procedure code 212 is configured to determine whether a user identification circuit 206 is present in the radio communication device 200; a control circuit 204 configured to control the processor 202 such that the operating system code 208 is loaded from the memory 210 during the execution of the authentication procedure code 212.

In other words, in an embodiment of the invention, a radio communication device 200 is provided, wherein code for operating the radio communication device 200 has to be loaded, e.g. when switching-on the radio communication device 200, from a memory 210 as part of the booting procedure. The code may e.g. be loaded from the memory 210 to another memory 214 associated to the processor 202, upon which the processor can execute the code.

An authentication procedure code 212, which is separate from the operating system code 208, is executed in parallel to perform the authentication of the user to use the radio communication device 200 and to access the communications network, e.g. a mobile radio communications network. In this way, the user interaction procedure may be started by the authentication procedure code 212 before the booting procedure is completed. Under the term "booting" may be understood providing a processor with an operating system by loading the operating system from a memory (e.g. a Read only Memory, e.g. a Flash non-volatile memory) to a further memory, e.g. a Random Access Memory (e.g. a Dynamic Access Memory) or, in general, an XIP (execute in place) memory, which the processor may use to execute the operating system.

The user interaction hence may start in a very early stage as the completion of the booting procedure has not to be waited for. Consequently an "idle" time for the user is avoided during which conventionally only the prompting for the authentication input, as e.g. a PIN, would be waited for. The user enters e.g. his PIN or other authentication information (e.g. a mixture of numbers and alphabetic characters) while the at least one processor continues its boot process in the background (in other words, as a background operation).

According to an embodiment of the invention, the processor 202 is a modem processor. The modem processor 202 may be responsible for the communication with corresponding nodes or stations e.g. a base station or a radio access node according to a communication protocol.

In an embodiment of the invention, the processor 202 of the radio communication device 200 may be configured to execute a radio communication protocol code. The radio communication protocol code may be the software implementation of the rules defined e.g. in a communications standard to communicate with other devices, stations or nodes.

According to an embodiment of the invention, the memory 210 is configured to store a radio communication protocol code. The memory 210 provides thus the radio communication protocol code to be executed by the processor 202. The memory 210, however, is not used for execution of the code directly but the code is transferred to another memory from which the code may be executed.

According to an embodiment, the radio communication protocol code is configured to implement a radio communication protocol stack including a plurality of communication protocol layers.

FIG. 3A shows exemplarily the software structure 300 of a communication device 200. The hardware platform 314 is the basis of this structure and may contain especially the processor 202 and the circuits associated with the processor 202, as well as peripheral devices. Above (considered in terms of communication layers) the hardware platform 314, the upper device drivers 312 are arranged. Device drivers 312 may be drivers for interfaces, busses, display, camera and video devices, audio devices, memory devices, keyboard, etc. The first layer 310 of the communication protocol is arranged above the hardware device drivers 312, carrying out the physical communication tasks; followed by the Layers 2 and 3 (in FIG. 3A denoted with reference number 308), as will be explained in more detail below. They are followed by one or more adaptation layers 306 and finally on the top of the communication layer stack, one or more application layers 302, 304. Applications may be the graphical user interface, multimedia applications, messaging, email, browser, data bases, Java Virtual Machine (JVM), games etc. In an embodiment of the invention, all (in another embodiment of the invention, some) layers may interact with the operating system 208.

The communication protocol stack layers 308, 310 may be integrated into the operating system 208 or it may be separated from the operating system 208.

According to an embodiment of the invention, the plurality of communication protocol layers 308, 310 contains at least two communication protocol layers selected from a group of communication protocol layers consisting of: Physical communication protocol layer responsible e.g. for coding, ciphering and radio transmission and reception; Data Link Layer; Medium Access Control (MAC) communication protocol layer; Radio Link Control (RLC) communication protocol layer; Radio Resource Control (RRC) communication protocol layer, GPRS (General Packet Radio Service) Radio Resource management (GRR) layer, Packet Data Convergence Protocol (PDCP), Radio Resource (RR) Layer, Global Mobility Management or GPRS Mobility Management & Session Management (GMM/SM), Internet Protocol (IP), Peer to Peer Protocol (PPP); and Open Settlement Protocol (OSP), Link Access Procedure for the D-Channel (LAPD), LAPDm, Broadcast-Multicast Control Protokoll (BMC).

Some of the communication protocol layers or communication protocol sub-layers mentioned above are defined according to a communication standard as listed below. However, also protocols or protocol layers not explicitly mentioned but with corresponding or similar tasks are addressed and may be used in accordance with another embodiment of the invention.

These layers may be arranged according to an OSI model (Open Systems Interconnection Reference Model) into a first (physical), second (data link) or third (network) communication protocol layer. The data link layer is responsible for an error-free transmission and the access to the access medium. The network layer is responsible for the switching of the connections in case of circuit switched connections and for the switching and routing of data packets in case of packet orientated connections.

Further, according to an embodiment of the invention, the radio communication protocol code is a mobile radio communication protocol code.

Furthermore, according to an embodiment, the mobile radio communication protocol code may be configured in accordance with a Third Generation Partnership Project mobile radio communication protocol code.

According to an embodiment of the invention, the mobile radio communication protocol code may be configured in accordance with at least one mobile radio communication protocol code selected from a group of mobile radio communication protocol codes consisting of: Global System for Mobile Communication (GSM) mobile radio communication protocol code; General Packet Radio Service (GPRS) mobile radio communication protocol code; Universal Mobile Telecommunication System (UMTS) mobile radio communication protocol code; Code Division Multiple Access (CDMA) mobile radio communication protocol code; Code Division Multiple Access 2000 (CDMA2000) mobile radio communication protocol code; Freedom of Mobile Multimedia Access (FOMA) mobile radio communication protocol code; Long Term Evolution (LTE) mobile radio communication protocol code, UMB (Ultra Mobile Broadband) communication protocol code; High Capacity Spatial Division Multiple Access (HC-SDMA) mobile radio communication protocol code; Time Division-Synchronous Code Division Multiple Access (TD-SCDMA) mobile radio communication protocol code, Flash-OFDM (Fast Low-latency Access with Seamless Handoff-Orthogonal Frequency Division Multiplexing), and Satellite Systems as e.g. Inmarsat, Iridium, Thuraya, ACeS (Asia Cellular Satellite), Ellipso, Orbcomm.

According to an embodiment, the operating system code 208 may be configured to implement a non-realtime operating system.

The non-realtime operating system may be an operating system that is primarily responsible for the applications and tasks not directly related to those mobile radio communication tasks that need realtime capability of the operating system. It may also be an operating system tailored to mobile applications.

Under the term "non-realtime operating system" an operating system may be understood that is not necessarily a real-time system as there exist also e.g. operating systems emerging from pure non-realtime operating systems, tailored to e.g. mobile applications that have been further developed to have realtime capabilities. The realtime capabilities, however, may be used if sufficient or may not be used.

According to an embodiment of the invention, the operating system code may be configured to implement at least one of the following operating system functions: a file system; a user management; a graphical user interface (GUI) as e.g. Qtopia, Opie, X-Server, Windows GUI, UIQ (User Interface Quartz), S60 (Series60), Google Android; and device drivers for driving e.g. display, interfaces, multimedia devices as e.g. camera, audio devices.

According to an embodiment, the operating system code 208 may be configured to implement a non-realtime operating system selected from a group of non-realtime operating systems consisting of a Windows-based operating system (e.g. Windows XP, Windows 2000, Windows CE; Windows Mobile; Windows Smartphones); a Unix-based operating system (e.g. Unix, Linux, BSD); an OS/2-based operating system (e.g. OS/2); a Macintosh-based operating system (e.g. OS X) or further operating systems specialized for mobile applications as e.g. EPOC, Symbian, or Palm OS.

According to an embodiment, the operating system code 208 may be configured to implement a realtime operating system.

The realtime operating system may be run e.g. by a communication processor as e.g. a modem processor and may be primarily responsible for the mobile radio communication tasks of the processor. The protocol stack of the communication protocol may be integrated into the realtime operating system.

However, the realtime operating system may of course also perform tasks of the application layers.

According to an embodiment, the operating system code 208 is configured to implement a realtime operating system selected from a group of realtime operating systems consisting of Nucleus, VxWorks, OSE, ThreadX, LynxOS, Phar Lap Embedded Tool Suite, INTEGRITY RTOS, SMX.

However, there may be further realtime operating systems that are suitable in respect to the communication tasks of the modem processor.

The user identification circuit 206 may be a removable physical device that can be connected to the communication device 200.

According to an embodiment of the invention, the radio communication device 200 further includes: a user identification circuit receiving space configured to receive the user identification circuit 206.

The user identification circuit 206 may contain personal information of a subscriber and serves primarily to authorize the user to use the communication device and to authenticate the user in the communications network.

According to an embodiment of the invention, the radio communication device may further include: a user identification circuit interface 206 configured to be electrically coupled to the user identification circuit. The electrical coupling may serve for the power supply of the circuit and its sub-circuits and for a secure data transfer. Moreover, the physical design and the connections may be standardized.

According to an embodiment of the invention, the user identification circuit 206 is a user identification card.

According to an embodiment of the invention, the user identification card may include a Subscriber Identity Module (SIM). The SIM card may be a card in accordance with a communication standard, as e.g. the GSM standard.

In an embodiment of the invention, the user identification card may be a Universal Integrated Circuit Card (UICC). The UICC may contain at least one UMTS Subscriber Identity Module (USIM). The card may hence also be in accordance with the UMTS standard.

According to an embodiment of the invention, the user identification card contains a user identification card processor; at least one user identification card memory; and at least one user identification card communication interface.

According to an embodiment of the invention, the authentication procedure further includes determining whether an authentication information is required, and the authentication procedure code 212 may further be configured to, in case it has been determined that a user identification circuit 206 is present in the radio communication device and the authentication information is required, request authentication information to be input. By requesting the authentication information input the user is asked to authenticate himself by e.g. typing a number using the keyboard or by providing e.g. biometrical information using a suitable sensor, e.g. a fingertip sensor or an eye sensor or a speech sensor for speaker verification.

According to an embodiment, the authentication information is a Personal Identification Number (PIN). Usually, the CHV (card holder verification) parameter has to be set "enabled" by the user in order to be prompted for the PIN when switching on the radio communication device.

According to an embodiment, the authentication information is a biometrical identification information. The biometrical identification information is gathered by e.g. optical, acoustic, capacitive, pressure sensitive or chemical methods sensing unique characteristics of a human being. Such characteristics may be a fingerprint, the voice, characteristics of the eye, e.g. the retina or iris, or face, or the signature. These identification methods may be applied stand-alone or as a combination of two or more methods. They may also be combined with the PIN entering method.

Figure 4:
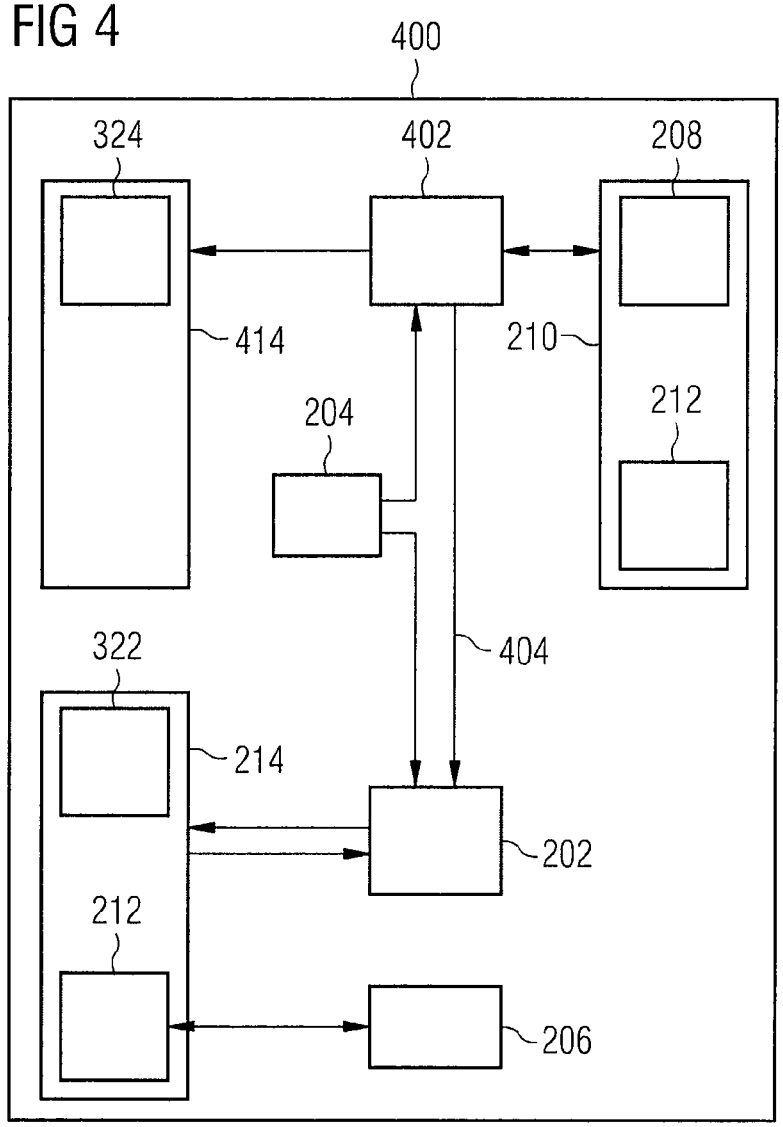
FIG. 4 shows a processor and memory arrangement of a mobile device according to an embodiment of the invention.

FIG. 4 shows the radio communication device 400 according to a further embodiment of the invention. According to this embodiment, the radio communication device 200 may further include a further processor 402 being connected to the processor 202 via a communication connection 404; wherein the memory 210 is coupled to the further processor 402; a further memory 414 coupled to the further processor 402; wherein the control circuit 204 is further configured to control the further processor 402 such that the operating system code 208 is loaded from the memory 210 via the further processor 402 and the communication connection 404 into a processor memory 214 of the processor 202 during the execution of the authentication procedure code 212.

The two processors may be, according to an embodiment, integrated onto a single hardware chip.

According to an embodiment, the communication connection 404 is a serial communication connection. The communication connection may also be a parallel communication connection, or any kind of data bus connection.

In an embodiment of the invention, the further processor 402 is an application processor.

As a consequence of the arrangement with two processors, a second operation system may be used.

The software structure of FIG. 3A may be considered logically. This means, in e.g. a system with two processors, as e.g. a modem processor and an application processor, the operating system block 208 may be divided into a plurality of (e.g. two) operating systems, e.g. one operating system for each of the two processors 202, 402. Then, as depicted in FIG. 3B one operation system 324 may be responsible for the applications and the other operating system 322 for the communication. In this case, each of the operation systems 322, 324 is running on its own hardware platform 314, 318 and their software device drivers 312, 316 are controlling their corresponding hardware devices or hardware device drivers.

According to an embodiment of the invention, the further processor 402 is configured to execute a non-realtime operating system 324.

The non-realtime operating system 324 may be an operating system that is primarily responsible for the applications and tasks not directly related to those mobile radio communication tasks that need realtime capability of the operating system. It may also be an operating system tailored to mobile applications. "Non-realtime" may be understood as that the operating system is not necessarily a real-time system.

In an embodiment of the invention, the non-real-time operating system code 324 is configured to implement at least one of the following operating system functions: a file system; a user management; a graphical user interface (e.g. Qtopia, Opie, X-Server, Windows GUI); and device drivers for driving e.g. display, interfaces, multimedia devices as e.g. camera, audio devices.

According to an embodiment, the non-realtime operating system code 324 may be configured to implement a non-realtime operating system selected from a group of non-realtime operating system consisting of: a Windows-based operating system (e.g. Windows XP, Windows 2000, Windows CE); a Unix-based operating system (e.g. Unix, Linux); an OS/2-based operating system (e.g. OS/2); a Macintosh-based operating system or further operating systems specialized for mobile applications as e.g. EPOC, Symbian, or Palm OS.

According to an embodiment, the memory 210 is a non-volatile memory.

In an embodiment of the invention, the memory 210 is a non-volatile Flash memory (e.g. a Charge Trapping memory, a floating gate memory, a magnetoresistive random access memory, a conductive bridging random access memory (CBRAM), a phase change memory (PCRAM), an organic random access memory (ORAM), etc.).

According to an embodiment, the further memory 414 is a volatile memory (e.g. a Dynamic random access memory (DRAM), etc.).

According to an embodiment, the processor memory 214 of the processor 202 is a volatile memory (e.g. a Dynamic random access memory, etc.).

Figure 5:
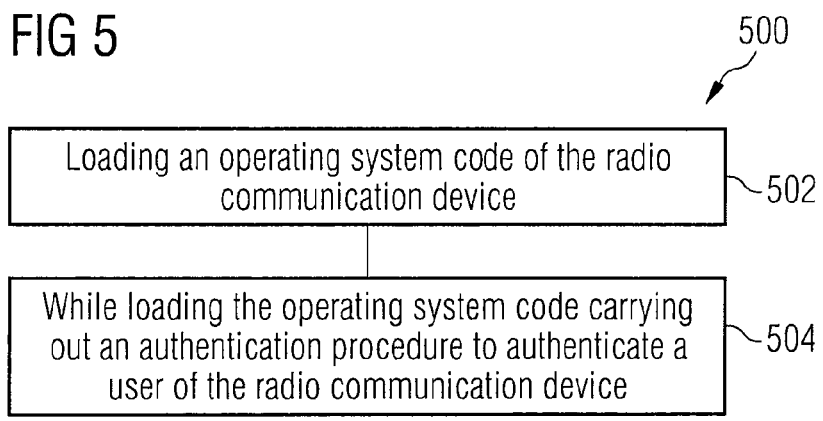
FIG. 5 shows a first method for booting a radio communication device according to an embodiment of the invention.

According to an embodiment of the invention, a method 500 for booting a radio communication device is provided as shown in FIG. 5.

In an embodiment of the invention, the method 500 may include:
 in 502, loading an operating system code of the radio communication device, and
 in 504, carrying out an authentication procedure to authenticate a user of the radio communication device while loading the operating system code of the radio communication device.

Authenticating the user while the booting procedure is performed may result in the user being occupied providing his authentication information during the booting time and hence the waiting time until the communication device is operable is reduced. As explained above, only a part of the operating system may be loaded when the communication device is switched on. As soon as some basic parts of the operating system are loaded, the authentication procedure, in which the user is involved may be started. The remaining parts of the operating system may be loaded while the user is occupied with the authentication procedure.

According to an embodiment of the invention, the operating system code of the radio communication device 200 is loaded into the processor memory of a processor of the radio communication device. The processor memory may be a memory integrated into the processor or a memory external in respect to the processor.

According to an embodiment of the invention, the authentication procedure includes determining whether a user identification circuit is present in the radio communication device.

The user identification circuit may contain secret information suitable to authenticate the user. As the user identification circuit may be a circuit that is physically removable, the authentication procedure needs the information if the user identification circuit is present in order to be able to perform the authentication.

According to an embodiment of the invention, the authentication procedure contains loading authentication procedure code.

The authentication code may be a code separate from the operating system code that is loaded and executed while booting the operating system.

According to an embodiment, the authentication procedure code of the radio communication device is loaded into a processor memory of a processor of the radio communication device.

The memory may be physically the same memory as the memory into which the operating system code is loaded or a different memory. A requirement for the memory is that the loaded code can be executed.

According to an embodiment of the invention, the processor is a modem processor.

The modem processor is especially responsible for the communication tasks for communicating with other devices, stations, or nodes. A communication protocol may be applied that defines the communication rules which have to be followed by the communication tasks.

According to an embodiment, the method 500 further includes loading a radio communication protocol code.

According to an embodiment, the method 500 may further include loading the radio communication protocol code into the processor memory of the processor of the radio communication device.

According to an embodiment, the radio communication protocol code of the method 500 may be configured to implement a radio communication protocol stack including a plurality of communication protocol layers.

According to an embodiment, the plurality of communication protocol layers contains at least two communication protocol layers selected from a group of communication protocol layers consisting of: Physical communication protocol layer responsible e.g. for coding, ciphering and radio transmission and reception; Data Link Layer; Medium Access Control (MAC) communication protocol layer; Radio Link Control (RLC) communication protocol layer; Radio Resource Control (RRC) communication protocol layer, GPRS (General Packet Radio Service) Radio Resource management (GRR) communication protocol layer, Packet Data Convergence Protocol (PDCP) communication protocol layer, Radio Resource (RR) Layer communication protocol layer, Global Mobility Management or GPRS Mobility Management & Session Management (GMM/SM) communication protocol layer, Internet Protocol (IP) communication protocol layer, Peer to Peer Protocol (PPP) communication protocol layer; and Open Settlement Protocol (OSP) communication protocol layer, Link Access Procedure for the D-Channel (LAPD) communication protocol layer, LAPDm, Broadcast-Multicast Control Protokoll (BMC) communication protocol layer.

Some of the communication protocol layers or communication protocol sub-layers mentioned above are defined according to a communication standard as listed below. However, also communication protocols or communication protocol layers not explicitly mentioned but with corresponding or similar tasks are addressed.

These layers may be arranged according to an OSI model (Open Systems Interconnection Reference Model) into a first (physical), second (data link) or third (network) layer. The data link layer is responsible for an error-free transmission and the access to the access medium. The network layer is responsible for the switching of the connections in case of circuit switched connections and for the switching and routing of data packets in case of packet orientated connections.

According to an embodiment, the radio communication protocol code is a mobile radio communication protocol code.

According to an embodiment, the mobile radio communication protocol code is configured in accordance with a Third Generation Partnership Project mobile radio communication protocol code.

According to an embodiment, the mobile radio communication protocol code is configured in accordance with at least one mobile radio communication protocol code selected from a group of mobile radio communication protocol codes consisting of: Global System for Mobile Communication (GSM) mobile radio communication protocol code; General Packet Radio Service (GPRS) mobile radio communication protocol code; Universal Mobile Telecommunication System (UMTS) mobile radio communication protocol code; Code Division Multiple Access (CDMA) mobile radio communication protocol code; Code Division Multiple Access 2000 (CDMA2000) mobile radio communication protocol code; Freedom of Mobile Multimedia Access (FOMA) mobile radio communication protocol code; Long Term Evolution (LTE) mobile radio communication protocol code; UMB (Ultra Mobile Broadband) mobile radio communication protocol code; High Capacity Spatial Division Multiple Access (HC-SDMA) mobile radio communication protocol code, Time Division-Synchronous Code Division Multiple Access (TD-SCDMA) mobile radio communication protocol code, Flash-OFDM (Fast Low-latency Access with Seamless Handoff-Orthogonal Frequency Division Multiplexing), and Satellite Systems as e.g. Inmarsat, Iridium, Thuraya, ACeS (Asia Cellular Satellite), Ellipso, Orbcomm.

According to an embodiment of the invention, the operating system code of the method 500 may be configured to implement a non-realtime operating system.

Also in the method 500 under the term "non-realtime operating system" an operating system may be understood that is not necessarily a real-time system.

According to an embodiment, the operating system code of the method 500 is configured to implement at least one of the following operating system functions: a file system; a user management; a graphical user interface, as e.g. Qtopia, Opie, X-Server, Windows GUI, Google Android; and device drivers for driving e.g. display, interfaces, multimedia devices as e.g. camera, audio devices.

According to an embodiment, the operating system code is configured to implement a non-realtime operating system selected from a group of non-realtime operating system consisting of: a Windows-based operating system (e.g. Windows XP, Windows 2000, Windows CE); a Unix-based operating system (e.g. Unix, Linux); an OS/2-based operating system (e.g. OS/2); a Macintosh-based operating system or further operating systems specialized for mobile applications as e.g. EPOC, Symbian, or Palm OS.

According to an embodiment of the invention, the operating system code of the method 500 is configured to implement a realtime operating system.

According to an embodiment, the operating system code is configured to implement a realtime operating system selected from a group of realtime operating systems consisting of Nucleus, VxWorks, OSE und ThreadX, LynxOS, Phar Lap Embedded Tool Suite, INTEGRITY RTOS, SMX.

According to an embodiment of the invention, the user identification circuit of the method 500 is a user identification card.

According to an embodiment, the user identification card contains a Subscriber Identity Module (SIM). The SIM card may be a card in accordance with a communication standard, as e.g. the GSM standard.

According to an embodiment, the user identification card may be a Universal Integrated Circuit Card (UICC). The UICC may contain at least one UMTS Subscriber Identity Module (USIM). The card may hence also be in accordance with the UMTS standard.

According to an embodiment, the user identification card contains a user identification card processor; at least one user identification card memory; and at least one user identification card communication interface.

According to an embodiment of the invention, the authentication procedure further includes determining whether an authentication information is required, and the authentication procedure code of the method 500 may further be configured to, in case it has been determined that a user identification circuit 206 is present in the radio communication device and the authentication information is required, request authentication information to be input.

By requesting the authentication information the user is asked to authenticate himself by e.g. typing a number using the keyboard or by providing e.g. biometrical information using a suitable sensor.

According to an embodiment of the invention, the authentication information is a Personal Identification Number (PIN). Usually, the CHV (card holder verification) parameter has to be set enabled by the user in order to be prompted for the PIN when switching on the radio communication device.

According to an embodiment, the method 500 further contains: loading the operating system code from a memory via a further processor and a communication connection between the further processor and the processor into the processor memory of the processor during the execution of the authentication procedure code.

By applying two processors the tasks of the operating systems may be split as yet described above.

According to an embodiment, the communication connection may be a serial communication connection, a parallel communication connection or any kind of data bus connection.

According to an embodiment, the further processor may be an application processor.

According to an embodiment, the further processor executes a non-realtime operating system.

According to an embodiment, the non-realtime operating system code may be configured to implement at least one of the following operating system functions: a file system; a user management; a graphical user interface (GUI) (e.g. Qtopia, Opie, X-Server, Windows GUI, UIQ (User Interface Quartz), S60 (Series60)); and device drivers for driving e.g. display, interfaces, multimedia devices as e.g. camera, audio devices.

According to an embodiment, the non-realtime operating system code is configured to implement a non-realtime operating system selected from a group of non-realtime operating system consisting of a Windows-based operating system (e.g. Windows XP, Windows 2000, Windows CE); a Unix-based operating system (e.g. Unix, Linux, BSD); an OS/2-based operating system (e.g. OS/2); a Macintosh-based operating system (e.g. OS X) or further operating systems specialized for mobile applications as e.g. EPOC, Symbian, or Palm OS.

According to an embodiment, the memory from which the operating system code is loaded is a non-volatile memory.

According to an embodiment, the memory from which the operating system code is loaded is a non-volatile Flash memory (e.g. a Charge Trapping memory, a floating gate memory, a magnetoresistive random access memory, a conductive bridging random access memory (CBRAM), a phase change memory (PCRAM), an organic random access memory (ORAM), etc.).

According to an embodiment, the further memory is a volatile memory (e.g. a Dynamic random access memory, etc.).

According to an embodiment, the processor memory of the processor is a volatile memory (e.g. a Dynamic random access memory (DRAM), etc.).

According to an embodiment of the invention, a radio communication device 600 is provided as shown in FIG. 6, containing a processor 602; a memory 604 configured to store a radio communication protocol code and an authentication procedure code, wherein the authentication procedure code is configured to determine whether a user identification circuit 608 is present in the radio communication device 600; a control circuit 606 configured to control the processor 602 such that the radio communication protocol code is loaded from the memory 604 during the execution of the authentication procedure code.

The authentication procedure code may thus already be (at least partially) executed before the code of the loading of the radio communication protocol is finished. Thus, the user does not have to wait for the end of the boot procedure. Instead, he may provide his authentication information as part of the authentication procedure during the boot process.

According to an embodiment of the invention, a method 700 for booting a radio communication device is provided as shown in FIG. 7, the method 700 including for example:
- in 702 loading a radio communication protocol code of the radio communication device, and
- in 704 carrying out an authentication procedure to authenticate a user of the radio communication device while loading the radio communication protocol code of the radio communication device.

Here again, the boot process and the authentication procedure are performed in parallel leading to a decrease of waiting time for the user until the communication device is operable.

Referring again to FIG. 6, according to an embodiment of the invention, a radio communication device 600 is provided, which may include a processor means 602; a memory means 604 for storing an operating system code and an authentication procedure code, wherein the authentication procedure code is configured to determine whether a user identification circuit 608 is present in the radio communication device 600; a control means 606 for controlling the processor 602 such that the operating system code is loaded from the memory 604 during the execution of the authentication procedure code.

FIG. 8 illustrates as an example a time diagram 800 according to an embodiment of the invention based on the radio communication device shown in FIG. 4. Events, as e.g. messages, and processes are shown for the user 802, the application processor 402 and the modem processor 202. The time in the diagram advances downwards in FIG. 8.

When the radio communication device 200 is switched on and the non-volatile memory 210 is available; the application processor 402 starts loading its operating system. The operating system may be an non-realtime operating system that is loaded 804 from the non-volatile memory 210 to the further DRAM 414. In parallel, the application processor 402 starts providing 806 the realtime operating system 322 to the modem processor 202. The arrow 808 indicates the loading of essential code, which is only a part of the operating system code 322 for the modem processor 202 but which is sufficient to execute the authentication code 212, which is sent (e.g. in 810) by the application processor 402 to the modem processor 202 after uploading (e.g. in 808) the essential code to the modem processor 202. In an embodiment of the invention, the modem processor 202 executes the code and performs a check if the SIM 206 or UICC 206, respectively is available and if the CHV is enabled. The modem processor 202 sends (e.g. in 812) the result to the application processor 402. At this time, also the application processor 402 has loaded only a part of its operating system from the non-volatile memory 210, sufficient to e.g. communicate (e.g. symbolized by reference number 814) with the user 802 by use of a display and a keyboard as the display driver and the keyboard driver are yet loaded. The user types in (e.g. in 816) his PIN after having been prompted correspondingly. It has to be noted that this event occurs at a very early point of time in respect to the whole boot process.

While the user is occupied with typing his PIN, the boot process may continue. The application loads (e.g. in 820) the remaining parts of the non-realtime operating system 324 and uploads (e.g. in 822) the realtime operating system 322 including the respectively desired or required communication protocol stack to the modem processor 202. A dotted arrow 822 indicates that the realtime operating system 322 is downloaded from the application processor 402 to the modem processor 202; the download activity related to the modem processor 202 is indicated by the arrow 824. In the meantime, it is assumed in this example that the user 802 has completed entering his PIN which is now received and stored (e.g. in 818) by the application processor 402. After the download (e.g. in 824) of the realtime operating system and finishing all initializations the modem processor transits to an operational state 826. Now, the application processor 402 may send (e.g. in 828) the stored PIN to the modem processor 202, so that the authentication procedure can be completed by the modem processor 202. When the application processor 402 has completed the loading of its operating system 324 and all initializations are performed, the booting and start-up procedure is complete and the communication device 200 is operational 830.

The application processor 402 and the modem processor 202 may be controlled by a control circuit 204. The loading of the two operation systems in the example may also be divided into sequences or may take place quasi-parallel. Furthermore, direct memory access-methods may be used.

To summarize, instead of downloading the protocol stack, consisting of several MB of code and data, in an embodiment of the invention, a small probing program may be downloaded which only task may be to check for the presence of a or UICC, respectively, and if CHV is enabled.

The outcome of the two checks is then signaled to the application processor 402, which task is then to take appropriate action (e.g. ask the user 802 to enter a PIN, inform the user 802 that no SIM or UICC, respectively, is attached). While the user 802 is busy entering the PIN, the application processor 402 may already start downloading the code for the modem processor 202. Once the user 802 has entered the PIN, the application processor 402 stores it until the communication protocol stack may be downloaded and the modem processor 202 may start the operation. Then, the PIN is transmitted to the modem processor 202 and CHV can take place.

The tasks of the probing program in accordance with an embodiment of the invention are for example:
Check for the presence of a SIM or UICC, respectively. If no SIM or UICC, respectively is present, the user is not prompted for a PIN entry.
Check whether CHV is enabled. If CHV is enabled, the user is prompted for PIN entry.
Error handling: The program should be able to detect and handle errors of the card interface and the SIM or UICC, respectively (e.g. insufficient electrical contact, SIM/UICC damaged).
Provide the application processor 402 with a status message: SIM/UICC present yes/no; SIM/UICC functional yes/no; CHV enabled yes/no.

Since the tasks of the probing program are very limited, the code size is estimated to be below 10 kbyte. This amount of data can be transmitted to the modem processor within a few milliseconds time. Compared to the time required to download the complete communication protocol stack, for example, which can take several seconds, the user can be prompted almost instantaneously for PIN entry (depending on the operating system). While the user enters the PIN, booting and start up processing if the application processor 402 and modem processor 202 can continue in the background, possibly unnoticed by the user.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:
1. A radio communication device, comprising:
a processor;
a memory configured to store an authentication procedure code and an operating system code associated with an operating system, the operating system code including a first portion and a second portion,
wherein the authentication procedure code is configured to determine whether a user identification card associated with a user is present in the radio communication device, and to perform authentication of the user to use the radio communication device and to access a communications network if the user identification card associated with the user is present; and
a control circuit configured to control the processor to:
load the first portion of the operating system code from the memory,
execute the authentication procedure code after the first portion of the operating system code has been loaded, and load the second portion of the operating system code from the memory after the execution of the authentication procedure code has been initiated.

2. The radio communication device of claim 1, wherein the processor is a modem processor.

3. The radio communication device of claim 1, wherein the processor is configured to execute a radio communication protocol code.

4. The radio communication device of claim 1, wherein the memory is configured to store a radio communication protocol code.

5. The radio communication device of claim 3, wherein the radio communication protocol code is configured to implement a radio communication protocol stack including a plurality of communication protocol layers.

6. The radio communication device of claim 5, wherein the plurality of communication protocol layers comprises at least two communication protocol layers selected from a group of communication protocol layers consisting of:
Physical communication protocol layer;
Medium Access Control communication protocol layer;
Radio Link Control communication protocol layer;
Radio Resource Control communication protocol layer;
Data Link Layer communication protocol layer;
General Packet Radio Service Radio Resource management communication protocol layer;
Packet Data Convergence Protocol communication protocol layer;
Radio Resource communication protocol layer;
Global Mobility Management or GPRS Mobility Management & Session Management communication protocol layer;
Internet Protocol communication protocol layer;
Peer to Peer Protocol communication protocol layer;
Open Settlement Protocol communication protocol layer;
Link Access Procedure for the D-Channel communication protocol layer;
LAPDm communication protocol layer; and
Broadcast-Multicast Control Protocol communication protocol layer.

7. The radio communication device of claim 3, wherein the radio communication protocol code is a mobile radio communication protocol code.

8. The radio communication device of claim 7, wherein the mobile radio communication protocol code is configured in accordance with a Third Generation Partnership Project mobile radio communication protocol code.

9. The radio communication device of claim 7, wherein the mobile radio communication protocol code is configured in accordance with at least one mobile radio communication protocol code selected from a group of mobile radio communication protocol codes consisting of:
Global System for Mobile Communication mobile radio communication protocol code;
General Packet Radio Service mobile radio communication protocol code;
Universal Mobile Telecommunication System mobile radio communication protocol code;
Code Division Multiple Access mobile radio communication protocol code;
Code Division Multiple Access 2000 mobile radio communication protocol code;
Freedom of Mobile Multimedia Access mobile radio communication protocol code; and
Long Term Evolution mobile radio communication protocol code.

10. The radio communication device of claim 1, wherein the operating system is a non-realtime operating system.

11. The radio communication device of claim 1, wherein the operating system is a realtime operating system.

12. The radio communication device of claim 1, further comprising:
a user identification card receiving space configured to receive the user identification card.

13. The radio communication device of claim 12, further comprising:
a user identification card interface configured to be electrically coupled to the user identification card.

14. The radio communication device of claim 1, wherein the authentication procedure code is further configured to determine whether an authentication information is required; and
wherein the authentication procedure code is further configured to, in case it has been determined that the user identification card is present in the radio communication device and the authentication information is required, to request the authentication information to be input by the user.

15. The radio communication device of claim 1, further comprising:
a further processor being connected to the processor via a communication connection;
wherein the memory is coupled to the further processor;
a further memory coupled to the further processor;
wherein the control circuit is further configured to control the further processor such that the operating system code is loaded from the memory via the further processor and the communication connection into a processor memory of the processor during the execution of the authentication procedure code.

16. The radio communication device of claim 15, wherein the communication connection is a serial communication connection, a parallel communication connection, or a data bus connection.

17. The radio communication device of claim 15, wherein the further processor is an application processor.

18. The radio communication device of claim 1, wherein the further processor is configured to execute a non-realtime operating system.

19. A method for booting a radio communication device, the method comprising:
determining whether a user identification card associated with a user is present in the radio communication device;
loading a first portion of an operating system code associated with an operating system of the radio communication device;
executing, after the first portion of the operating system code has been loaded, an authentication procedure to authenticate the user to use the radio communication device and to access a communications network if the user identification card associated with the user is present; and
loading a second portion of the operating system code associated with the operating system of the radio communication device after the execution of the authentication procedure code has been initiated.

20. The method of claim 19,
wherein the authentication procedure further comprises determining whether a user identification card associated with the user is present in the radio communication device.

21. The method of claim 19,
wherein the authentication procedure further comprises determining whether an authentication information is required; and
wherein the authentication procedure code is further configured to, in case it has been determined that the user identification card associated with the user is present in the radio communication device and the authentication information is required, to request an authentication information to be input by the user.

22. A radio communication device, comprising:
a processor;
a memory configured to store a radio communication protocol code, an authentication procedure code, and an operating system code associated with an operating system, the operating system code including a first portion and a second portion,
wherein the authentication procedure code is configured to determine whether a user identification card associated with a user is present in the radio communication device, and to perform authentication of the user to use the radio communication device and to access a communications network if the user identification card associated with the user is present; and
a control circuit configured to control the processor to:
load the first portion of the operating system code from the memory,
execute the authentication procedure code after the first portion of the operating system code has been loaded,
load the second portion of the operating system code from the memory after the execution of the authentication procedure code has been initiated, and
load the radio communication protocol code from the memory during execution of the authentication procedure code.

23. The method of claim 19, further comprising:
loading a radio communication protocol code of the radio communication device during the authentication procedure.

24. A radio communication device, comprising:
a processor means;
a memory means for storing an authentication procedure code and an operating system code associated with an operating system, the operating system code including a first portion and a second portion,
wherein the authentication procedure code is configured to determine whether a user identification card associated with a user is present in the radio communication device, and to perform authentication of the user to use the radio communication device and to access a communications network; and
a control means for controlling the processor to:
load the first portion of the operating system code from the memory,
execute the authentication procedure code after the first portion of the operating system code has been loaded, and
load the second portion of the operating system code from the memory after the execution of the authentication procedure code has been initiated.

25. The radio communication device of claim 1, wherein the processor is configured to execute the authentication procedure code based on the first portion of the operating system code.

26. The radio communication device of claim 25, wherein the first portion of the operating system code further comprises information of a time duration before the authentication information to be input by the user is requested.

27. The radio communication device of claim 1, wherein the authentication procedure code is further configured to perform the authentication of the user before expiration of a predetermined authentication timing requirement.

28. The radio communication device of claim 27, wherein predetermined authentication timing requirement is predetermined by a network operator of the communications network.

29. The radio communication device of claim 14, wherein the authentication procedure code further comprises information of a time duration before the authentication information to be input by the user is requested.

30. The radio communication device of claim 14, wherein the authentication information to be input by the user is a predetermined personal identification number configured to authorize the user to use the radio communicating device and access the communication network.

31. The method of claim 21, wherein the authentication information to be input by the user is a predetermined personal identification number configured to authorize the user to use the radio communicating device and access the communication network.

32. The method of claim 21, wherein the authentication procedure code further comprises information of a time duration before the authentication information to be input by the user is requested.

* * * * *